US012760575B2

(12) United States Patent
Jaehnke et al.

(10) Patent No.: US 12,760,575 B2
(45) Date of Patent: Oct. 13, 2026

(54) METHOD FOR PIVOTING A LEAF USING A DRIVE DEVICE AND DRIVE DEVICE FOR PIVOTING A LEAF

(71) Applicant: dormakaba Deutschland GmbH, Ennepetal (DE)

(72) Inventors: Jan-Hendrik Jaehnke, Ennepetal (DE); Konstantin Lygin, Ennepetal (DE); Sven Busch, Ennepetal (DE); Mike Schueller, Bocholt (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 183 days.

(21) Appl. No.: 18/027,736

(22) PCT Filed: Sep. 24, 2021

(86) PCT No.: PCT/EP2021/076317
§ 371 (c)(1),
(2) Date: Mar. 22, 2023

(87) PCT Pub. No.: WO2022/063959
PCT Pub. Date: Mar. 31, 2022

(65) Prior Publication Data

US 2023/0374840 A1 Nov. 23, 2023

(30) Foreign Application Priority Data

Sep. 25, 2020 (DE) ........................ 102020125098.3

(51) Int. Cl.
*E05F 15/63* (2015.01)
*E05F 1/10* (2006.01)
*E05F 15/73* (2015.01)

(52) U.S. Cl.
CPC .............. *E05F 15/63* (2015.01); *E05F 1/105* (2013.01); *E05F 15/73* (2015.01);
(Continued)

(58) Field of Classification Search
CPC ..... E05Y 2400/3013; E05Y 2400/3015; E05Y 2400/3016; E05Y 2400/302;
(Continued)

(56) References Cited

U.S. PATENT DOCUMENTS 3,968,595 A * 7/1976 Sheckells .............. E05F 15/608 188/185
5,789,887 A * 8/1998 Elischewski ....... G05B 19/0428 318/452
(Continued)

FOREIGN PATENT DOCUMENTS

CN 106460441 B 4/2019
DE 102009001668 A1 9/2010
(Continued)

OTHER PUBLICATIONS

Translated International Search Report for International Application No. PCT/EP2021/076317, International Filing Date Sep. 24, 2021, Date of Mailing Apr. 4, 2022, 3 pages.
(Continued)

*Primary Examiner* — Justin B Rephann
(74) *Attorney, Agent, or Firm* — CANTOR COLBURN LLP

(57) ABSTRACT

A method for pivoting a leaf from a closed position at an opening angle of 0° to an open position at an opening angle of greater than 0° and/or from the open position at the opening angle of greater than 0° to the closed position at the opening angle of 0° by a leaf torque, wherein the leaf toque has a manual torque, generated by a person, and a drive torque, wherein the drive torque is generated by a drive device with a drive module, a closer module and a controller module. The drive module has an electric machine having a stator and a rotor, wherein the closer module has an, in particular mechanical, energy storage, wherein the controller module has a controller device, wherein the drive torque has
(Continued)

a machine torque generated by the electric machine and a closer torque generated by the closer module.

14 Claims, 8 Drawing Sheets

(52) U.S. Cl.
CPC ..... *E05Y 2201/412* (2013.01); *E05Y 2400/85* (2013.01); *E05Y 2900/132* (2013.01)

(58) Field of Classification Search
CPC ......... E05Y 2400/616; E05Y 2900/132; E05F 1/105; E05F 1/1058; E05F 1/10; E05F 1/002; E05F 1/00; E05F 15/63; E05F 15/73
See application file for complete search history.

(56) References Cited

U.S. PATENT DOCUMENTS

| | | | | |
|---|---|---|---|---|
| 5,956,249 | A | 9/1999 | Beran et al. | |
| 6,108,975 | A | 8/2000 | Bailey | |
| 7,183,933 | B2 * | 2/2007 | Dzurko | G08B 21/14 49/31 |
| 7,246,688 | B2 * | 7/2007 | Tonna | E05F 15/635 187/324 |
| 7,571,515 | B2 * | 8/2009 | Fischbach | E05F 3/223 49/342 |
| 7,707,951 | B1 * | 5/2010 | Prasad | E05G 5/003 109/30 |
| 8,225,458 | B1 * | 7/2012 | Hoffberg | E05F 15/73 16/84 |
| 10,236,801 | B2 * | 3/2019 | Dye | E05F 1/105 |
| 10,704,313 | B2 * | 7/2020 | Houser | E05F 15/63 |
| 2003/0213092 | A1 * | 11/2003 | Fischbach | E05F 3/102 16/52 |
| 2006/0242908 | A1 * | 11/2006 | McKinney | E05F 15/77 49/280 |
| 2009/0206777 | A1 * | 8/2009 | Taheri | E05F 15/643 49/31 |
| 2013/0340343 | A1 * | 12/2013 | Dye | H02P 3/14 49/350 |
| 2018/0058132 | A1 * | 3/2018 | Clift | E05F 15/70 |
| 2018/0148970 | A1 * | 5/2018 | Houser | E05F 15/60 |
| 2023/0160246 | A1 * | 5/2023 | Persson | E05D 15/02 49/42 |

FOREIGN PATENT DOCUMENTS

| | | | |
|---|---|---|---|
| DE | 102013224148 | A1 | 5/2015 |
| DE | 102006062333 | B4 | 5/2016 |
| EP | 0662185 | B1 | 4/1997 |
| EP | 3361030 | A1 | 8/2018 |
| WO | 2013169888 | A1 | 11/2013 |
| WO | 2014152907 | A1 | 9/2014 |

OTHER PUBLICATIONS

European Office Action for Application No. 21 782 549.6, dated Dec. 9, 2025, 13 pages with machine translation.

* cited by examiner

METHOD FOR PIVOTING A LEAF USING A DRIVE DEVICE AND DRIVE DEVICE FOR PIVOTING A LEAF

CROSS-REFERENCE TO RELATED APPLICATIONS

This application is a 35 U.S.C. § 371 National Stage patent application of PCT/EP2021/076317, filed on 24 Sep. 2021, which claims the benefit of German patent application 102020125098.3, filed on 25 Sep. 2020, the disclosures of which are incorporated herein by reference in their entirety.

TECHNICAL FIELD

The disclosure relates to a method for pivoting a leaf with the features of the preamble of claim 1. However, the disclosure also relates to a drive device for pivoting the leaf with the features of the preamble of claim 13.

The disclosure can be used in a drive device for pivoting a leaf, wherein a leaf is understood to mean in particular a door or window leaf. The pivoting part of a door is referred to as a door leaf, for which the term door sash is also common.

BACKGROUND

Such a method and such a drive device are known. A drive device comprises a control module for an electric machine, which is configured in such a way that it controls the electric machine depending on the actual closing speed of the leaf, such that the leaf moves at a target closing speed in the direction of its close situation. When using this drive device on doors or windows that have a lock with a latch, it may be the case that the closing leaf of the door or window cannot overcome the resistance of the latch and thus gets stuck on the latch. There is therefore a risk that the leaf will not close completely.

SUMMARY

Against this background, the task arises of improving the leaf movement process, in particular in such a way that the probability of the leaf being closed is increased. In particular, the opening of the leaf should also be facilitated. Preferably, the closing movement of the leaf should further be improved, in particular in such a way that the closing movement of the leaf takes place more gently and/or with reduced risk to a person.

The task is solved by providing a method with the features of claim 1. However, the task is also solved by a drive device with the features of claim 13. Advantageous improvements of the method and the drive device are specified in the respective dependent claims, the description and in the figures. Features and details that are described in connection with the drive device according to the disclosure also apply in connection with the method according to the disclosure and/or the use according to the disclosure and vice versa. In this case, the features mentioned in the description and in the claims may each be essential to the disclosure individually by themselves or in combination. The description additionally characterizes and specifies the disclosure, in particular in connection with the figures.

Particularly advantageously, a method for pivoting a leaf, in particular a door leaf or a window leaf, from a closed position at an opening angle of 0° to an open position at an opening angle greater than 0° and/or from the open position at the opening angle greater than 0° to the closed position at the opening angle of 0° by means of a leaf torque is shown. The leaf torque comprises a manual torque, generated in particular by a person, and a drive torque. The drive torque is generated by means of a drive device with a drive module, a closer module and a controller module, wherein the drive module has an electric machine having an, in particular single, stator and an, in particular single, rotor. The closer module has an, in particular mechanical, energy storage. The controller module has a controller device. The drive torque comprises a machine torque generated directly or indirectly by the electric machine and a closer torque generated by the closer module. At at least one opening angle of greater than 0°, the machine torque is greater than 0 Nm.

In particular, this can be provided for any opening angle that is greater than 0°.

Below, the term closing movement is used synonymously with a movement from the open position to the closed position. Below, the term opening movement is used synonymously with a movement from the closed position to the open position.

The term torque means torques exerted directly or indirectly on the leaf.

The machine torque greater than 0 Nm means an amount of the machine torque. In this way, what is meant is both a machine torque that supports the closing movement, in particular an additional closing torque, and a braking torque that counteracts the closing movement of the door, in particular a closer torque of the closer module.

In particular, the drive device, preferably the electric machine and/or a transmission and/or the energy storage, can be configured in such a way that the drive device, in particular by means of the torque, can be used to move the leaf without manual force exerted by a person, in particular without a manual torque exerted by a person, which can be applied to the leaf, in particular in a fully automated manner. However, the movement of the leaf can be accelerated by the manual force exerted by the person, in particular the manual torque, on the leaf.

The movement of the leaf here means an opening movement and/or a closing movement of the leaf.

Alternatively, the drive device, preferably the electric machine and/or the transmission and/or the energy storage, can be configured as an auxiliary drive in such a way that the movement of the leaf is only performed if at least at one point in time of the movement of the leaf, in particular at a beginning of the movement, in addition to a force generated by the drive device, in particular a torque, a manual force exerted by a person, in particular a manual torque exerted by a person, is exerted on the leaf.

During a closing movement of the leaf from the open position to the closed position, a first method step can preferably be that the electric machine generates a first braking torque, wherein the first braking torque is the closer torque of the closer module in the opposite direction, such that the closing movement of the leaf is slowed down and/or stopped.

In particular, the first method step can take place at an opening angle of less than 70°, in particular less than 60°, in particular less than 50°, in particular less than 40°, in particular less than 30°, in particular less than 20°, in particular less than 10°.

More preferably, it can be provided that the electric machine can generate an additional closing torque in a second method step following the first method step, which adds up to the closer torque of the closer module, such that the closing movement of the leaf takes place with increased drive torque. It can be preferred that the electric machine generates the additional closing torque, when the leaf has fallen below a first predetermined opening angle. The additional closing torque can be generated as long as the current opening angle is greater than 0 degrees. The current opening angle means the opening angle currently determined by means of the controller device. It can be particularly preferred that the first predetermined opening angle is in a range from 0.5 degrees to 7 degrees, in particular in a range from 1 degree to 5 degrees, in particular in a range from 1 degree to 3 degrees. In this way, the additional closing torque can be generated when the current opening angle of the leaf is less than the first predetermined opening angle and greater than 0 degrees. This allows an increase in the closing torque only in a leaf position in which the leaf is just before the closed position. In particular, the first predetermined opening angle can be 1 or 2 or 3 or 4 or 5 or 6 or 7 degrees.

In particular, the electric machine can only generate the additional closing torque if the predetermined first opening angle is in a range from 0.5 degrees to 7 degrees, in particular in a range from 1 degree to 5 degrees, in particular in a range from 1 degree to 3 degrees, is fallen below. This means that the electric machine does not generate any additional closing torque at other opening angles.

With such small opening angles, it is ensured that the risk of injury is avoided, since, for example, a finger cannot fit into possible gaps between the leaf and frame. On the other hand, this ensures that the leaf safely reaches the closed position and is not held up in the open position by a draft of air, for example.

In particular, the additional closing torque can be adjusted via an operating element of the drive device.

In particular, a first opening angle range for carrying out the first method step and/or a second opening angle range for carrying out the second method step can be entered via an operating element of the drive device.

In a further preferred embodiment, it can be provided that the opening angle is determined by means of an angle measuring device of the drive device. It can be preferred that the angle measuring device is designed as at least one Hall sensor and/or as at least one inertial sensor.

In particular, the inertial sensor can be arranged on a moving part, in particular on the rotor or on the leaf or on a lever for connecting the drive device with the leaf or with the frame. In particular, the Hall sensor and/or the inertial sensor can detect a position of the rotor.

In particular, the inertial sensor for detecting the six possible kinematic degrees of freedom can have three mutually orthogonal acceleration sensors for detecting the translational movement and/or three orthogonal gyroscopic sensors for detecting rotating movements.

In particular, an output shaft of the drive module can be connected in a rotationally fixed manner to the lever to design a connection of the drive device to the leaf or to a frame. The lever is used to design the connection between the drive device and the leaf or the frame, wherein the drive device can be mounted on the frame or on the leaf. Within the meaning of the disclosure, the term frame also includes a door frame or window frame. In particular, the lever can be formed in such a way that a power supply of the electric machine and/or at least one controller signal for the electric machine can be transmitted via the lever to the transmission gearbox module, in particular to the electric machine.

Preferably, it can be provided that the sensor is formed as part of the drive device, wherein preferably the sensor can be arranged at least partially, in particular completely, within a housing of the drive device, or in that the sensor is arranged on the leaf. Alternatively or cumulatively, the sensor can be arranged on the lever.

In a further preferred embodiment, it can be provided that the controller device controls the additional closing torque of the electric machine depending on the opening angle of the leaf during the second method step.

Thereby, it can be preferred that the controller device monitors the opening angle in the second method step, wherein the drive device increases the additional closing torque if the leaf is in the open position, in particular for longer than a first predetermined period of time, during the second method step. It can be preferred that during the second method step the additional closing torque is increased continuously or step-wise until the leaf is in the closed position or until the maximum machine torque of the electric machine is reached.

More preferably, it can be provided that during the second method step, the drive device emits an error message when the maximum machine torque of the electric machine has been reached and the leaf is in the open position, and/or when the leaf is in the open position for longer than a second predetermined period of time.

It can be preferred that during a closing movement of the leaf from the open position to the closed position, the electric machine generates a second braking torque, in particular over a certain period of time, wherein the second braking torque opposes a closer torque of the closer module and compensates the closer torque of the closer module, such that the closing movement of the leaf is stopped if the closing movement of the leaf is stopped by means of the manual torque for at least a third predetermined period of time.

The second braking torque can be triggered in particular when the leaf is held at a specific opening angle, particularly preferably in an opening angle range of 60° to 180°.

This means that temporarily holding the leaf in a specific open position over the predetermined third period of time results in the leaf being held in this open position by means of the second braking torque of the electric machine over at least the specific period of time or permanently. In this way, a simple and intuitive determination of the leaf in a specific open position is made possible.

In particular, the second braking torque can be generated independently of the first method step and/or independently of the second method step. Alternatively, the second braking torque can only be generated in an opening angle range that is larger than the opening angle range for the second method step and/or than the opening angle range for the first method step.

Preferably, it can be provided that the second braking torque is generated until a closing signal to the drive device is sent and/or until the leaf resumes the closing movement due to the manual torque.

The closing signal can be generated by means of an operating element on the drive device or on the leaf. Alternatively or cumulatively, the second braking torque can be ended when the closing movement of the leaf is continued by a manual torque being exerted in the closing direction of the leaf. In this way, the previously prevailing balance between the closer torque and the second braking torque is disturbed, such that the closing movement continues. The drive device thus recognizes that the closing movement is to be continued again and terminates the second braking torque.

In a preferred embodiment of the method, it can be provided that if a person's intention to open is detected, an additional opening torque is generated by means of the electric machine, wherein the intention to open is detected by means of at least one sensor, wherein the sensor is formed as an inertial sensor and/or as a Hall sensor and/or as an acoustic sensor. The additional opening torque means a torque that opposes the closer torque. The intention to open can be detected independently of the current opening angle of the leaf.

In particular, the person's intention to open can be detected if the sensor detects even the smallest changes in the opening angle of the leaf, in particular less than 1°, preferably less than 0.75°, particularly preferably less than 0.5°, in particular less than 0.25°, in particular less than 0.1°, detected in the direction of the open position. The intention to open can be detected based on this change in the opening angle of the leaf independently of the current opening angle. This means that these changes in the opening angle in the direction of the opening position can be detected from the closed position, thus at an opening angle of 0 degrees, and/or from any opening angle and recognized as an intention to open. In this way, the intention to open can already be recognized when the person exerts the manual torque on the leaf in the direction of the open position without operating a leaf latch. Furthermore, the intention to open can already be recognized when the person operates a leaf handle without exerting a manual torque. When the leaf latch is operated, it is common for the opening angle of the leaf to change without an additional manual torque being exerted, such that an intention to open can also be detected here. As a result, the electric machine can bring about the opening movement of the leaf independently and/or in support of the manual torque even with the slightest indication of the intention to open. Furthermore, when the leaf moves into the closed position, an intention to open can be detected if a person causes a manual torque on the leaf against the closing movement of the leaf, such that the opening angle of the leaf is increased from the current position. In this way, a closing movement of the leaf can be interrupted, in which case the electric machine can then independently and/or in support of the manual torque bring about the opening movement of the leaf.

Alternatively or cumulatively, the sensor can be formed as an acoustic sensor, in particular for detecting structure-borne noise and/or airborne noise. In particular, the acoustic sensor can be a structure-borne noise sensor, in particular a vibration acceleration sensor and/or a vibration velocity sensor and/or a vibration displacement sensor. Such a sensor can detect the smallest vibrations generated by relevant parts, in particular by the leaf and/or by the latch and/or by the electric machine and/or by the lever connecting the drive device to the leaf or the frame and/or by the drive device. The sensor can already detect a person touching the leaf latch or a person approaching the leaf, such that the additional torque can already be generated in the closed position of the door. In this way, an opening movement of the leaf can be designed fully automatically and/or supported from the beginning by the additional opening torque.

In an even more preferred embodiment, it can therefore be provided that the sensor is formed as an acoustic sensor. It can therefore be preferred that the additional opening torque is already generated in the closed position of the leaf.

In particular, the acoustic sensor can be thereby arranged on the leaf and/or on a leaf latch and/or on the lever for connecting the drive device with the leaf or frame and/or on the drive device and/or on the controller device of the drive device. In particular, the data determined by means of the acoustic sensor can be sent to the controller device by means of a line or wirelessly.

The solution to the task can also be achieved with a drive device that is configured in particular to carry out the method. A drive device for pivoting a leaf, in particular a door leaf or a window leaf, from a closed position at an opening angle of 0° to an open position at an opening angle greater than 0° and/or from the open position at the opening angle greater than 0° to the closed position at the opening angle of 0° by means of a leaf torque is shown. The leaf torque comprises a manual torque, generated in particular by a person, and a drive torque. The drive torque is generated by means of the drive device with a drive module, a closer module and a controller module, wherein the drive module has an electric machine comprising an, in particular single, stator and an, in particular single, rotor. The closer module has an, in particular mechanical, energy storage. The controller module has a controller device. The drive torque comprises a machine torque generated directly or indirectly by the electric machine and a closer torque generated by the closer module. At at least one opening angle of greater than 0°, the machine torque is greater than 0 Nm.

In a preferred arrangement, the drive device can have a transmission coupled to the electric machine and an output shaft, which can be rotated about an output axis, for the, in particular non-rotatable, connection to the lever. It can be preferred that the transmission has a transmission ratio as a quotient of the speed of the rotor as a dividend and the speed of the output shaft, which is less than 125, in particular less than 100, in particular less than 75.

In particular, the transmission can have a second transmission element, which is operatively connected to the first transmission element. An axis of rotation of the second transmission element runs in an installation space between the machine axis and an outer circumferential surface of the rotor virtually extended in the axial direction of the electric machine or an outer circumferential surface of the stator virtually extended in the axial direction of the electric machine, in particular parallel to the machine axis.

This arrangement is advantageous in terms of saving installation space in the radial direction of the electric machine.

In particular, the first transmission element can be arranged entirely in an installation space, wherein the installation space is delimited by an outer circumferential surface of the rotor which is virtually extended in the axial direction of the electric machine.

In particular, the first and the second transmission element or the entire transmission can be arranged completely in one installation space, wherein the installation space is delimited by the outer lateral surface of the rotor which is virtually extended in the axial direction of the machine or by the outer lateral surface of the stator which is virtually extended in the axial direction of the machine.

In particular, the drive device can have a machine housing and/or a transmission housing and/or a motor transmission housing, wherein it is possible for the electric machine to be arranged at least partially within the machine housing, wherein it can be particularly preferred that the transmission is at least partially arranged within the motor transmission housing.

Alternatively or cumulatively, the electric machine and/or the transmission can be arranged at least partially within the motor transmission housing.

This arrangement is advantageous in terms of modularity. Thereby, the wording—within the housing—means that the elements are arranged at least partially, in particular completely, in the space formed by the housing.

In particular, the machine housing and/or the transmission housing can be formed by the motor transmission housing.

In particular, the machine housing and/or the transmission housing can have prefabricated receiving points for a form-fitting and/or force-fitting and/or cohesive connection to one another. Furthermore, the machine housing and/or the transmission housing can be formed in one piece.

In particular, the machine housing and/or the motor transmission housing and/or the closer housing can each have one or more prefabricated receiving points for the form-fitting and/or force-fitting and/or cohesive connection with the electric machine and/or the transmission.

This arrangement is advantageous with regard to a simple and easy-to-assemble execution.

In particular, the transmission can be formed as a gear transmission, in particular as a spur gear and/or planetary transmission, or as an eccentric transmission. In particular, the transmission can be formed as a combination of planetary transmission and a spur gear. A ring gear of the planetary transmission can have external teeth and act as a spur gear, wherein in particular the ring gear is in engagement with the closer gear of the closer module and/or an interface element and/or wherein the ring gear forms the interface element.

As a planetary transmission, the transmission can have a sun gear that is non-rotatable with the rotor, in particular in one piece, multiple planetary gears fastened around the sun gear on a planetary carrier, and a ring gear that meshes with the planets. In this case, the ring gear can be rotatably mounted and form the power output of the planetary gear, wherein the planetary carrier is designed to be stationary. Alternatively, the planet carrier can be rotatably stored and form the power output of the planetary gear, wherein the ring gear is designed stationary. The terms planet and planetary gear are used synonymously.

As a planetary transmission, the transmission can also have at least one Wolfrom stage. In a preferred embodiment of such a Wolfrom stage, the planetary transmission has a first transmission stage and a transmission gear stage, wherein the first transmission stage comprises a sun gear, multiple first planets attached to a planetary carrier and driven by the sun gear, and a first stationary ring gear, and the second transmission stage comprises a second rotatable ring gear, second planets which are rotationally fixed with the first planets, in particular integral planets, wherein the second planets drive the second ring gear. In particular, the second ring gear can form the power output of the planetary transmission.

As an eccentric transmission, the transmission can be designed as a planetary eccentric transmission and/or shaft transmission.

In particular, the transmission can be formed as a planetary transmission, wherein the first transmission element is designed as a sun gear and at least one second transmission element is designed as a planetary gear. In particular, the transmission can have at least one Wolfrom stage.

In particular, the transmission can comprise the first ring gear, which is in engagement with the planetary gear, wherein the planetary gear is rotatably mounted on a planetary carrier, wherein the planetary carrier is rotatably mounted on the sun gear or on the rotor non-rotatably connected to the sun gear.

In particular, the first ring gear can have a first number of teeth and the transmission has a second ring gear with a second number of teeth, wherein the difference between the first and the second number is a value that is less than 5, preferably less than 2, particularly preferably 1.

In particular, the drive device can have the output shaft, which is rotatable about the output axis, for the, in particular non-rotatable, connection to the lever, wherein the output axis runs parallel or coaxially to a machine axis of the electric machine.

It can be preferred that the electric machine is formed as an axial flux machine, wherein the stator has one or more coils and the rotor has one or more permanent magnets.

In the axial flux machine, the magnetic flux is mainly formed parallel to the machine axis of the electric machine. The axial flux machine has a small overall axial length compared to other machine types. The axial overall length means an overall length in a direction parallel to the machine axis. The use of an axial flux machine therefore enables the dimensions of the electric machine to be reduced in the axial direction. This allows a compact arrangement of the motor transmission module. In particular, the axial flux machine can be a brushless direct current machine, in particular a BLDC machine. Such a machine is constructed like a three-phase synchronous machine with excitation by permanent magnets.

The electric machine, thus also the axial flux machine, can be formed as a motor and/or generator. As a motor, the machine can generate a rotational movement, in particular a torque, from electrical energy. As a generator, the machine can generate electrical energy from a rotational movement, in particular from a torque.

In particular, the stator can have one or more coils, preferably 7 to 16, particularly preferably 10 to 14 coils, wherein the coil or coils of the stator can be arranged such that a magnetic flux can be generated by the coil or coils in a direction parallel to the machine axis.

The term coil means an electrical conductor with at least one winding. The electrical conductor can be designed as an insulated wire and/or insulated strip, in particular by means of a coating, preferably by means of an insulating lacquer. For this purpose, the conductor can have an insulating coating, in particular an insulating varnish. In particular, the coil can be formed as a cast coil, wherein individual windings of the coil are electrically insulated from one another by means of a cast material.

In particular, the rotor can comprise at least one permanent magnet, wherein the permanent magnet is arranged along a virtual circle around the machine axis and spanning a first angular range. The stator can comprise a stator base with at least one stator tooth protruding from the stator base, in particular in the axial direction of the axial flux machine, wherein the stator tooth is arranged along a virtual circle around the machine axis and spanning a second angular range. The ratio of the first angular range as a dividend to the second angular range is in the range from 1.1 to 1.6, preferably in the range from 1.2 to 1.5, particularly preferably in the range from 1.3 to 1.4. If there are several teeth and/or magnets, each tooth can have the above-mentioned ratio to each magnet. Alternatively or cumulatively, in the case of several magnets and teeth, a summed area, i.e., a ratio, can be in a range from 1.3 to 1.9 or even from 1.5 to 1.8.

For the purposes of the disclosure, the term circle around the machine axis means that the machine axis forms the center point of the circle.

In particular, a surface of the stator tooth running parallel to the stator base, in particular of each stator tooth, can be designed in such a way that the surface widens in the radial direction of the stator, starting from the machine axis. Alternatively or cumulatively, a surface of the permanent magnet running parallel to the stator base, in particular of each permanent magnet, can be designed in such a way that the surface widens in the radial direction of the rotor, starting from the machine axis. In this way, the specified ratio of the first angular range as a dividend to the second angular range can be kept constant along the radial course of the stator. In particular, the surface of the stator tooth running parallel to the stator base, in particular of each stator tooth, can remain constant along the axial course of the stator tooth.

In particular, the stator can have a stator base and various of the stator teeth projecting from the stator base, in particular in the axial direction of the machine, wherein a coil is wound directly or indirectly around at least one of the stator teeth, in particular around each stator tooth. In particular, the stator teeth can protrude from a common surface of the stator base. In particular, the stator base can be connected to at least one, in particular each, stator tooth in a form-fitting and/or force-fitting and/or cohesive manner or can be formed in one piece. In particular, the stator can have the stator base, which has a base section, in particular in the form of a plate, and various of stator teeth protruding from a common surface of the base section, in particular in the axial direction of the machine.

In particular, at least one tooth can have a tooth casing, wherein the coil can be arranged around the tooth casing. In particular, the tooth casing can be electrically insulating, preferably comprising at least partially of a plastic, particularly preferably be formed as an injection molded component.

In particular, the ratio between the number of permanent magnets as a dividend and the number of coils can be in a range from 1.0 to 1.6, preferably in a range from 1.2 to 1.4, particularly preferably 4/3, in particular 1.1, in particular 7/6.

In particular, at least one, in particular each, permanent magnet can be formed in a plate shape. In particular, the rotor can have a rotor plate, in particular a rotor disk. Furthermore, at least one, in particular each, permanent magnet can protrude from the rotor plate of the rotor in the axial direction of the machine, in particular in the direction of the stator. In particular, the rotor plate can have one or more recesses, in particular a number of indentations corresponding to the number of permanent magnets, with a permanent magnet lying in each recess. In particular, the shape of the recess, in particular each recess, can correspond to the shape of the inlaid permanent magnet. This serves to secure the permanent magnets on the rotor, particularly on the rotor plate.

In particular, the electric machine, in particular as a motor, can have a ratio of the maximum torque to the axial extent of the machine that is greater than 30 Nm/m, preferably greater than 100 Nm/m, particularly preferably greater than 200 Nm/m. The axial extent is parallel to the machine axis. In particular, this ratio can be greater than 50 Nm/m, preferably greater than 70 Nm/m, particularly preferably greater than 150 Nm/m. In particular, the electric machine can have a torque density, i.e., torque to motor volume, of greater than or equal to 6000 Nm/m3, preferably greater than or equal to 15,000 Nm/m^3 and particularly preferably greater than or equal to 20,000 Nm/m^3 and/or a torque constant of greater than or equal to 0.1 Nm/A, preferably greater or equal to 0.2 Nm/A and particularly preferably greater than or equal to 0.3 Nm/A. This refinement enables a compact construction of the transmission and such small transmission ratios, while still enabling the door to be closed reliably, wherein the drive device is of compact construction overall.

In particular, the electric machine can have in its arrangement as an axial flux machine a ratio between the extent of at least one stator tooth in the axial direction of the electric machine as a dividend and the extent of the stator base in the axial direction of the electric machine, with the ratio being greater than or equal to 2, in particular greater than or equal to 3, in particular greater than or equal to 4, in particular greater than or equal to 5, in particular greater than or equal to 6.

In another aspect, the drive device for moving a leaf, in particular a door leaf or a window leaf, may comprise a motor transmission module comprising a motor transmission housing, the electric machine with the machine axis, the gearbox with the output shaft rotatably mounted about the output axis for connection to the lever. The drive device has the closer module comprising a closer housing and the mechanical energy storage. The drive device has an interface element for forming an operative connection between the motor transmission module and the closer module.

The machine axis means the axis of rotation about which a rotor of the electric machine rotates.

In particular, the interface element can be operatively connected to, in particular engaged with, the transmission and operatively connected to the energy storage.

In particular, the mechanical energy storage can comprise one or more compression springs and/or tension springs, which are connected via a lug carriage to a translation element for translating the linear movement of the energy storage into a rotational movement of the translation element. In particular, the translation element can be formed as a cam disk, particularly preferably as a heart-shaped lifting cam disk.

In particular, the output axis and the axis of rotation of the translation element can run parallel to one another. On the one hand, the output shaft and the translation element therefore do not rotate about the same axis of rotation and can be arranged in different positions, in particular in a modular manner. On the other hand, the parallel run reduces energy losses and facilitates assembly.

Torque can be transmitted from the output shaft to the closer module and/or from the closer module to the output shaft by means of the interface element. The interface element can be formed by means of at least one transmission element of the transmission and/or by means of at least one element of the closer module and/or by an additional element. The interface element can be designed in one piece or in several pieces.

In particular, the electric machine and the transmission can be arranged at least partially, in particular completely, within the motor transmission housing. In particular, the mechanical energy storage can be arranged at least partially, in particular completely, within the closer housing.

The drive device can preferably be provided in a rotary leaf drive. In a rotary leaf drive, a leaf is pivoted from a closed position, in which the leaf rests against a frame, into to an open position about a leaf axis by means of the drive device, wherein the torque is transmitted by means of a lever from the output shaft of the drive device to the door or to the frame. The drive device can thereby be mounted on the leaf, wherein a running rail can be arranged on the frame, or mounted on the frame, wherein a running rail can be arranged on the leaf. In addition to the drive device, the rotary leaf drive can also comprise the lever and/or the running rail and/or the leaf. In particular when used on fire protection leaves, the drive device can have the closer module. In the event of a fire, the closer module ensures that the fire protection leaf closes, in particular without manual operation.

In particular, the drive device can be mounted on the leaf or on a door frame or on a window frame. The terms axis, leaf axis and output axis mean virtual axes, in particular axes of rotation, which are not limited in their extension.

In particular, the transmission can be arranged at least partially, in particular completely, in a space between the output axis and the machine axis.

In particular, the motor transmission module and/or the closer module can be arranged at least partially, in particular completely, within a superordinate housing. In particular, the motor transmission housing can be connected to the superordinate housing and/or to the closer housing in a force-fitting and/or form-fitting and/or cohesive manner. In particular, the closer housing can be connected to the superordinate housing in a force-fitting and/or form-fitting and/or cohesive manner. In particular, one or more such connections can be designed in the form of at least one screw connection and/or a pin connection and/or a press fit and/or a T-groove and/or a snap connection.

In particular, the motor transmission housing can have one or more prefabricated receiving points for a form-fitting and/or force-fitting and/or cohesive connection with the electric machine and/or the transmission and/or an output shaft. In particular, the closer housing can have one or more prefabricated receiving points for a form-fitting and/or force-fitting and/or cohesive connection with the closer gear and/or the translation element and/or an axle body and/or the lug carriage.

In particular, the motor transmission housing can comprise a first opening and the closer housing can comprise a second opening, wherein the motor transmission housing and the closer housing are arranged relative to one another in such a way that the closer module, in particular the energy storage, and the transmission, in particular the output shaft, are in operative connection with one another by means of the interface element. In this case, the walls of the respective housings, which comprise the first and the second opening, can be designed in such a way that the motor transmission housing and the closer housing can be mounted flush with one another.

In particular, the interface element may comprise at least one gear, in particular multiple gears.

In particular, the machine housing and/or the transmission housing and/or the motor transmission housing and/or the closer housing and/or the controller housing can be arranged within the superordinate housing. This allows the individual elements to be protected.

BRIEF DESCRIPTION OF THE DRAWINGS

Further details and advantages of the disclosure are to be explained below with reference to the exemplary embodiments shown in the figures. Herein shows.

DETAILED DESCRIPTION OF THE DRAWINGS

Figure 1:
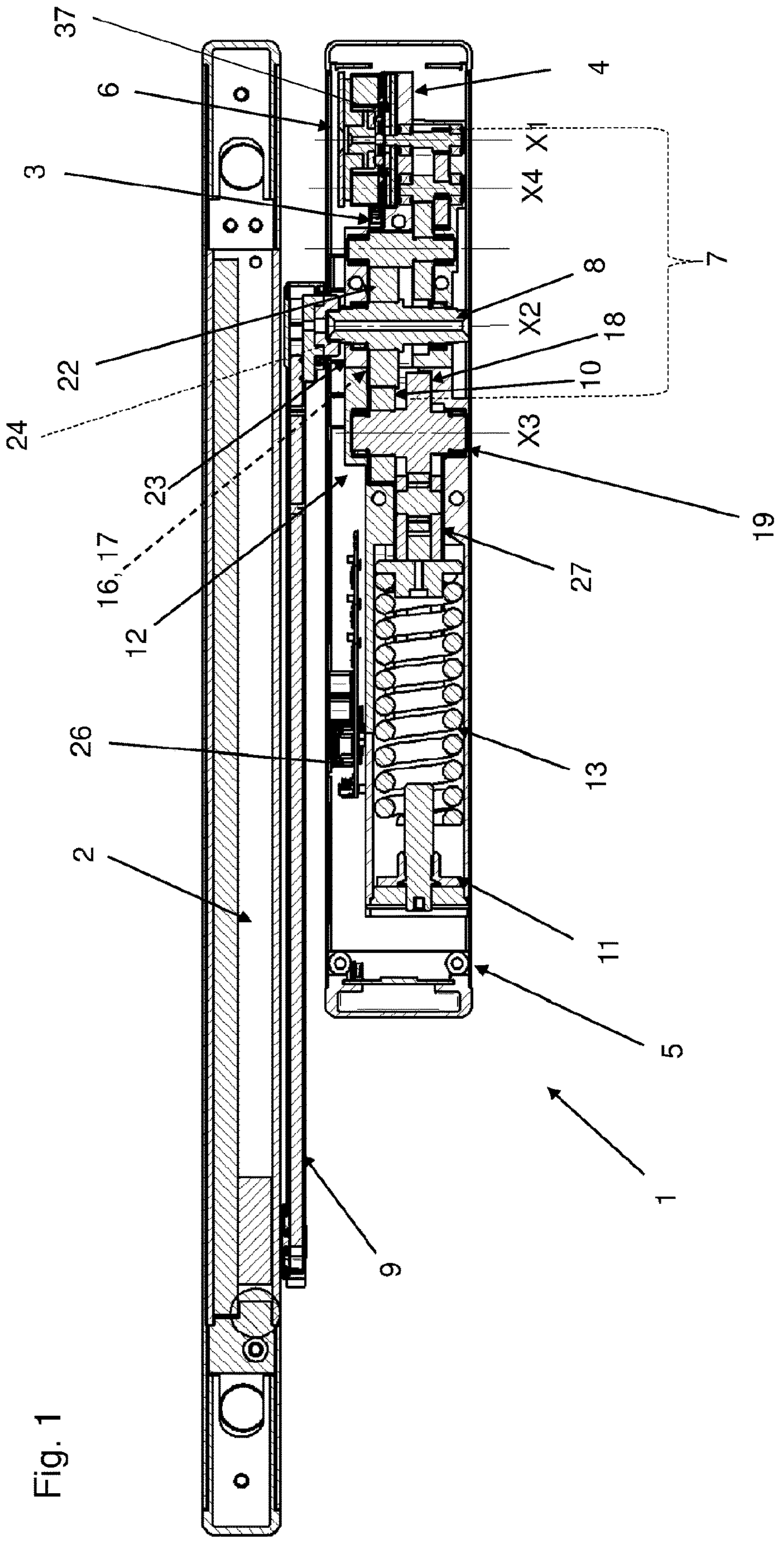
FIG. 1 an exemplary embodiment of a drive device according to the disclosure in a schematic sectional view.

The same parts are always provided with the same reference numerals in the different figures, which is why they are generally also only described once.

FIG. 1 shows a drive device 1 for pivoting a leaf 44 (FIG. 7*a*), in particular a door leaf or a window leaf. The drive device 1 has a drive module, which is designed, for example, as a motor transmission module 3. The motor transmission module 3 has a motor transmission housing 4, an electric machine 6 having a machine axis X1, and a transmission 7 with an output shaft 8 mounted rotatably about an output axis X2 for connection to a lever 9. The drive device 1 also has a closer module 11 which has a closer housing 12 and a mechanical energy storage 13. The drive device 1 has an interface element for forming an operative connection between the motor transmission module 3 and the closer module 11.

The transmission 7 has a transmission ratio as a quotient of the speed of the rotor as a dividend and the speed of the output shaft, wherein the transmission ratio is less than 125, preferably less than 100, particularly preferably less than 75.

The lever 9 is used to design a connection between the drive device 1 and the leaf 44, thus with the exemplary door leaf or window leaf or with a frame 48, wherein the drive device 1 can optionally be mounted on the frame 48 or on the leaf. Within the meaning of the disclosure, the term frame also includes a door frame 48 or window frame. In particular, the lever 9 can be formed in such a way that a power supply of the electric machine 6 and/or at least one controller signal for the electric machine 6 can be transmitted via the lever 9 to the transmission gearbox module 3, in particular to the electric machine 6 and/or controller module 26. The lever 9 is guided in a running rail 2, which in the exemplary embodiment shown in FIGS. 1 and 2 would be mounted on a frame 48 (not shown there), but which can be seen in FIG. 7*a*.

Figure 2:
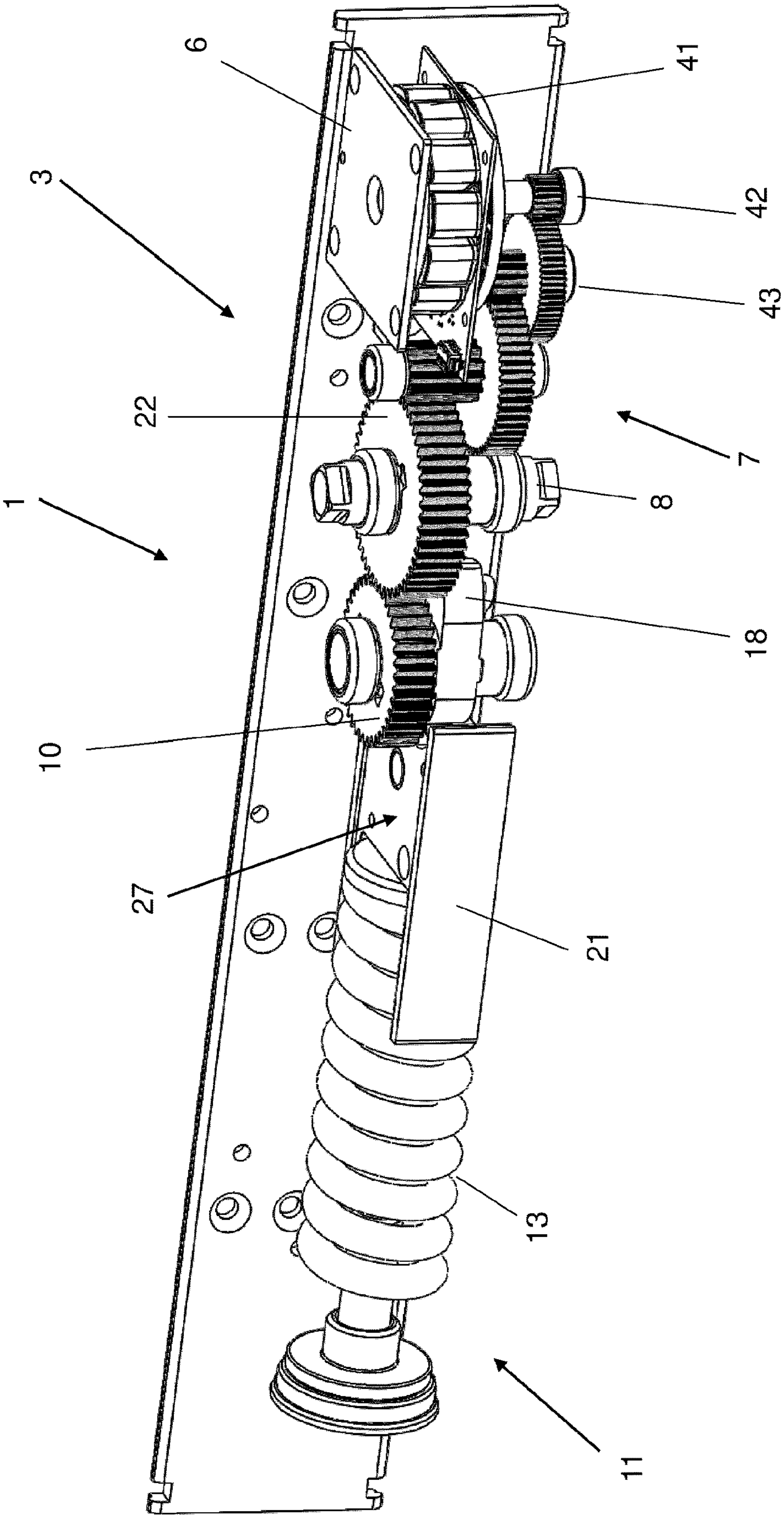
FIG. 2 the drive device from FIG. 1 as a detail in a perspective view.

As can be clearly seen in FIGS. 1 and 2, the output shaft 8 is arranged in an installation space between the machine axis X1 of the electric machine 6 and the energy storage 13.

The motor transmission housing 4 has a first opening 16, wherein the closer housing 12 has a second opening 17. As can be seen in FIG. 1, the motor transmission housing 4 and the closer housing 12 are arranged with respect to one another in such a way that the closer module 11, in particular the energy storage 13, and the transmission 7, in particular the output shaft 8, are in operative connection to one another by means of the interface element through the first opening 16 and the second opening 17.

The motor transmission module 3 and/or the closer module 11 is respectively arranged at least partially, in particular completely, within a superordinate housing 5. The motor transmission housing 4 is connected to the superordinate housing 5 and/or to the closer housing 12 in a non-positive and/or positive and/or cohesive manner. The closer housing 12 is non-positively and/or positively and/or cohesively connected to the superordinate housing 5. One or more such connections are designed, for example, in the form of at least one screw connection.

It can be seen in FIGS. 1 and 2 that the output axis X2 is parallel to the machine axis X1.

The closer module 11 has a translation element 18 for translating a linear movement of the energy storage 13 into a rotational movement of the translation element 18 about an axis of rotation X3 of the translation element 18. As can be seen, for example, in FIG. 1, the output axis X2 and the axis of rotation X3 of the translation element 18 are spaced apart from one another and run parallel to one another. The translation element 18 is formed as a cam disk, specifically as a heart-shaped lifting cam disk, and is rotatably stored with a closer gear 10 in a rotationally fixed manner.

For example, the mechanical energy storage 13 is designed as a compression spring. The compression spring is connected to the translation element 18 with a lug carriage 27 in order to translate the linear movement of the mechanical energy storage 13 into a rotational movement of the translation element 18. The plate lug carriage 27 has sliding elements 21, which can be seen in FIG. 2. The lug carriage 27 can be seen in FIG. 4.

The closer gear 10 is arranged coaxially and non-rotatably with the translation element 18 for translating the linear movement of the energy storage 13 into a rotational movement of the translation element 18.

The transmission 7 has an output gear 22, namely an output gear which is coaxial with the output shaft 8 and non-rotatable, wherein the output gear 22 is in engagement with the closer gear 10.

In the exemplary embodiment of FIGS. 1 and 2, the interface element is formed by the output gear 22.

For example, the motor transmission housing 4 has a first wall 23 with an output opening 24 for the non-rotatable connection of the output shaft 8 to the lever 9, a second wall adjoining the first wall 23 and a third wall opposite the second wall, wherein the drive device 1 is formed such that both the second wall and the third wall face the leaf, so to be attached to the exemplary door leaf. The same can apply to the closer housing 12. The motor transmission housing 4 and also the closer housing 12 can each be formed in a cuboid shape in order to enable assembly on both sides.

The controller module 26, which has a controller device, can also be seen in FIG. 1. The controller module 26 is arranged at least partially, in particular completely, within the superordinate housing 5 of the drive device 1.

Figure 3:
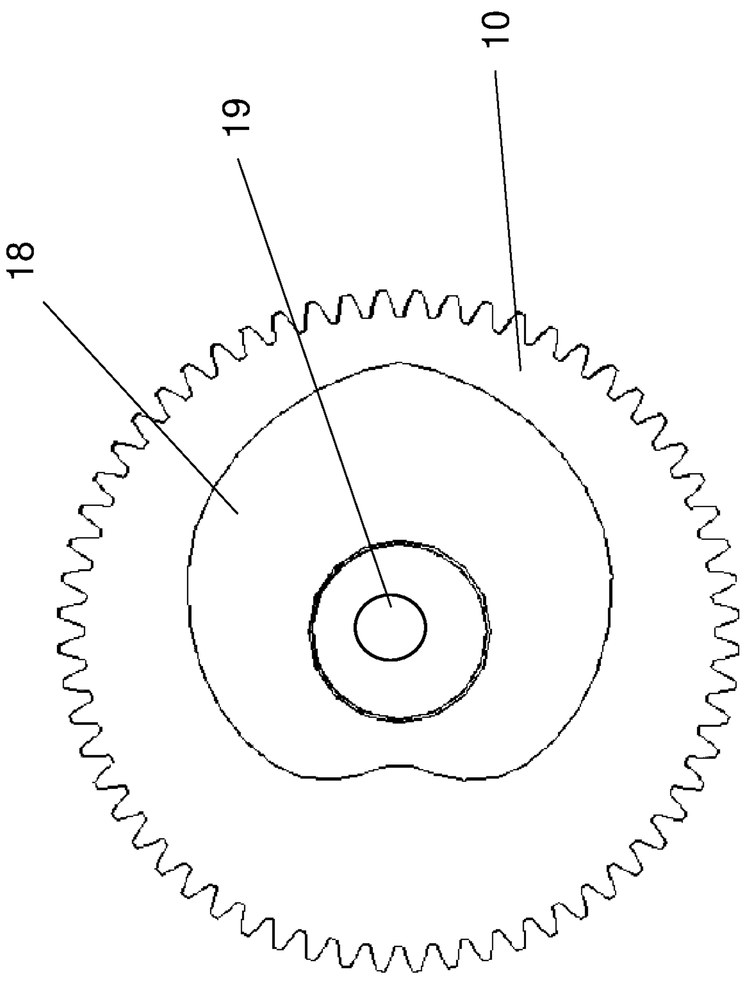
FIG. 3 a translation element as a detail in a top view.

FIG. 3 shows a special embodiment, wherein the translation element 18 is formed as a cam disk, specifically as a heart-shaped lifting cam disk. As can further be seen in FIG. 3, a fixed axle body 19 is arranged, wherein the translation element 18 and the closer gear 10 are rotatably stored on the axle body 19.

Figure 4:
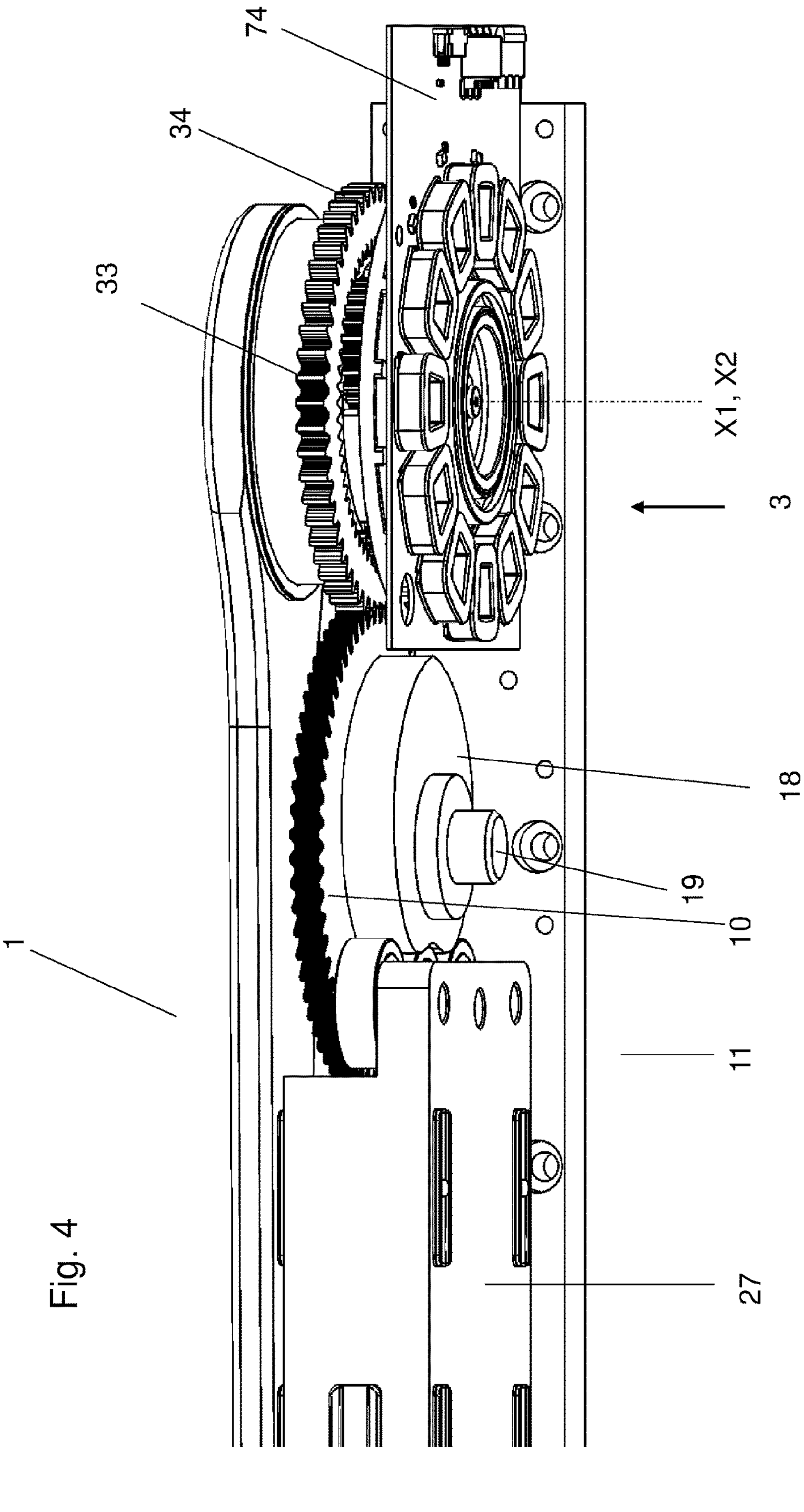
FIG. 4 a further exemplary embodiment of a drive device with a planetary transmission, FIG. 5 the drive device from FIG. 4 with the ring gear removed, FIG. 6 an axial flux machine in a schematic representation in section.
Figure 5:
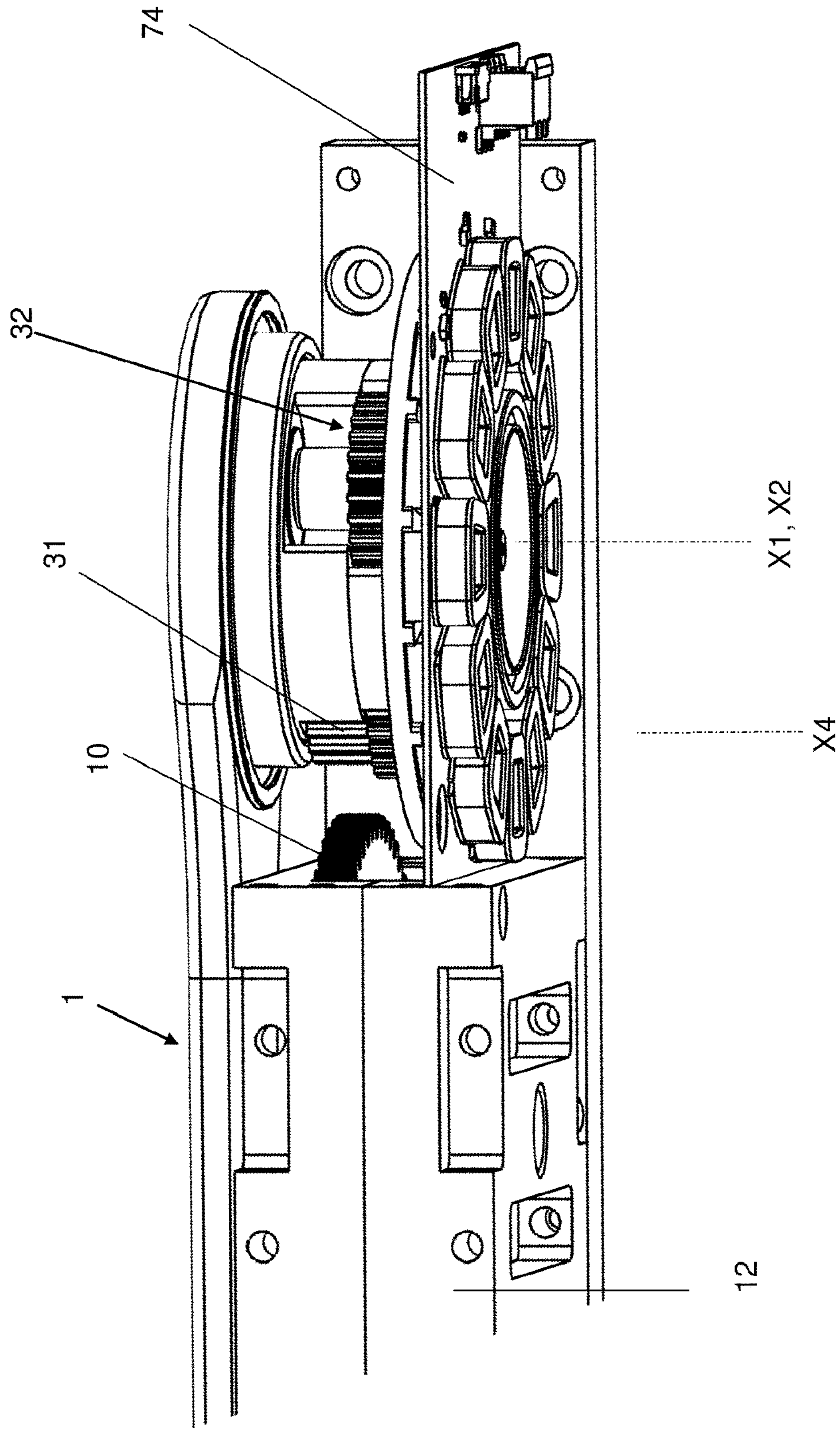

In FIGS. 4 and 5, the drive device 1 is shown in a further embodiment, wherein the optional transmission 7 is designed in contrast to the embodiment of FIGS. 1 and 2 as a planetary transmission. The terms planet and planetary gear are used synonymously.

As a planetary transmission, the transmission 7 has at least one Wolfrom stage. Such a Wolfrom stage has a first transmission stage and a second transmission stage. The first transmission stage comprises a sun gear, multiple first planets 31 fastened to a planetary carrier and driven by the sun gear, and a first, stationary ring gear. The sun gear and the first stationary ring gear cannot be seen in FIGS. 4 and 5 because of the section chosen. The second transmission stage comprises a second rotatable ring gear 33, second planets 32 that are non-rotatable with the first planets 31 and are in particular formed in one piece. The second planets 32 drive the second ring gear 33. The second ring gear 33 forms the power output of the planetary transmission. In FIG. 5, the second ring gear is removed.

The transmission 7 according to the exemplary embodiment of FIGS. 4 and 5 is formed as a combination of planetary transmission and a spur gear. The ring gear 33 of the planetary transmission has external teeth 34 and acts as a spur gear. The ring gear 33 meshes with the closer gear 10 of the closer module 11. In the exemplary embodiment of FIGS. 4 and 5, the closer gear 10 forms the interface element.

In the exemplary embodiment of FIGS. 4 and 5, the output axis X2 is coaxial with the machine axis X1.

In the exemplary embodiments described, the electric machine 6 is designed as an axial flux machine.

Figure 6:
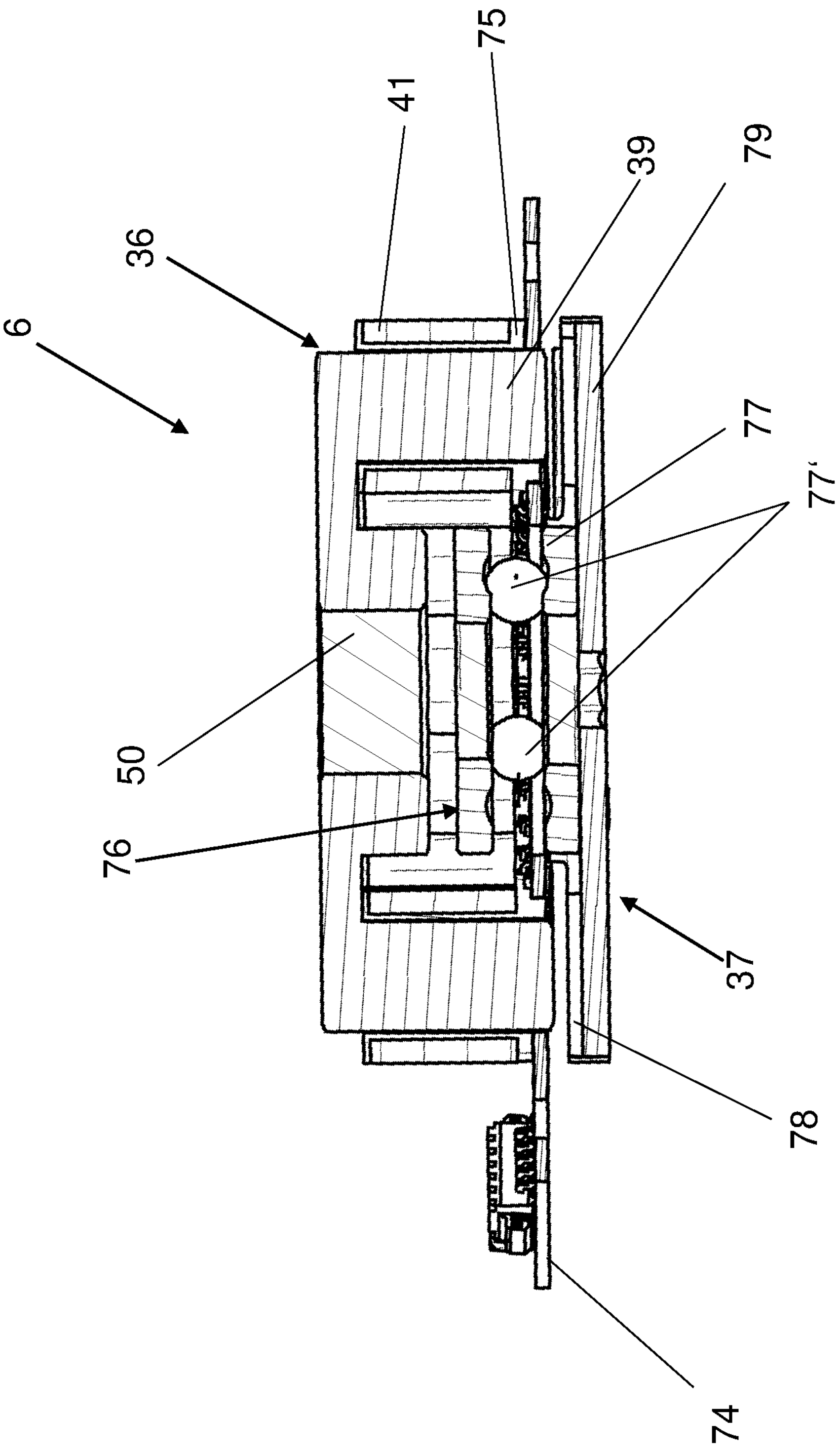

The electric machine 6 is shown in principle as a detail in FIG. 6. The electric machine 6 has a stator 36 and a rotor 37. The stator 36 has a plate-shaped stator base 38 and various stator teeth 39 protruding from the stator base 38 in the axial direction of the electric machine 6. Thereby, a coil 41 is arranged around each of the stator teeth 39. Each stator tooth 39 has an electrically insulating tooth casing 75, wherein the stator 36 has multiple coils 41 and each of the coils 41 is wound around the tooth casing 75 and therefore indirectly via the tooth casing 75 around the stator tooth 39. The stator teeth 39 pass through a printed circuit board 74 on which the coils 41 are contacted.

It can be seen in FIG. 6 that the stator 36 also comprises a stationary bolt 50, wherein the bolt 50 has a bearing holder 76 for accommodating a rolling bearing 77. A rolling bearing 77 with balls 77' is shown in FIG. 6 as an example. The drive device 1 comprises the rolling bearing 77 for the rotatable mounting of the rotor 37 relative to the stator 36, wherein the rolling bearing 77 is accommodated on the bearing holder 76 of the bolt 50. The rotor 37 is rotatably mounted on the stator 36 by means of the rolling bearing 77. In an embodiment not represented, a bearing holder can be provided directly on the stator base, on which a rolling bearing can be held. The rotor 37 comprises multiple permanent magnets 78. Each permanent magnet 78 is formed in a plate shape. The rotor 37 has a rotor plate 79 in the form of a rotor disc. Furthermore, each permanent magnet 78 protrudes from the rotor plate 79 of the rotor 37 in the axial direction of the electric machine, in particular in the direction of the stator 36.

As can best be seen from FIGS. 1 and 2, the transmission 7 has a first transmission element 42 which can be rotated coaxially with the machine axis X1 and which is connected to the rotor 37 in a rotationally fixed manner. The transmission 7 also has a second transmission element 43, which is operatively connected to the first transmission element 42, wherein an axis of rotation X4 of the second transmission element 43 runs in an installation space between the machine axis X1 and an outer circumferential surface of the rotor 37 virtually extended in the axial direction of the electric machine 6 or an outer circumferential surface of the stator 36 virtually extended in the axial direction of the electric machine 6, in particular parallel to the machine axis X1.

The drive device 1 according to the exemplary embodiments described above is configured to carry out a method 100 for pivoting a leaf 44, in particular a door leaf or a window leaf, from a closed position 46 at an opening angle $\alpha$ of 0° to an open position 47 at an opening angle $\alpha$ greater than 0° and/or from the open position 47 at the opening angle $\alpha$ greater than 0° to the closed position 46 at the opening angle $\alpha$ of 0° by means of a leaf torque, wherein the leaf torque comprises a manual torque, in particular generated by a person, and a drive torque. The drive torque is generated by the drive device 1 with a drive module, a closer module 11 and a controller module 26. The drive module is designed as a motor transmission module 3, for example. The drive module has the electric machine 6, comprising the, in particular single, stator 36 and the, in particular single, rotor 37. The closer module 11 has the, in particular mechanical, energy storage 13. The controller module 26 has a controller device. The drive torque comprises a machine torque generated directly or indirectly by the electric machine 6 and a closer torque generated by the closer module 11. At at least one opening angle α of greater than 0°, the machine torque is greater than 0 Nm.

Figure 7B:
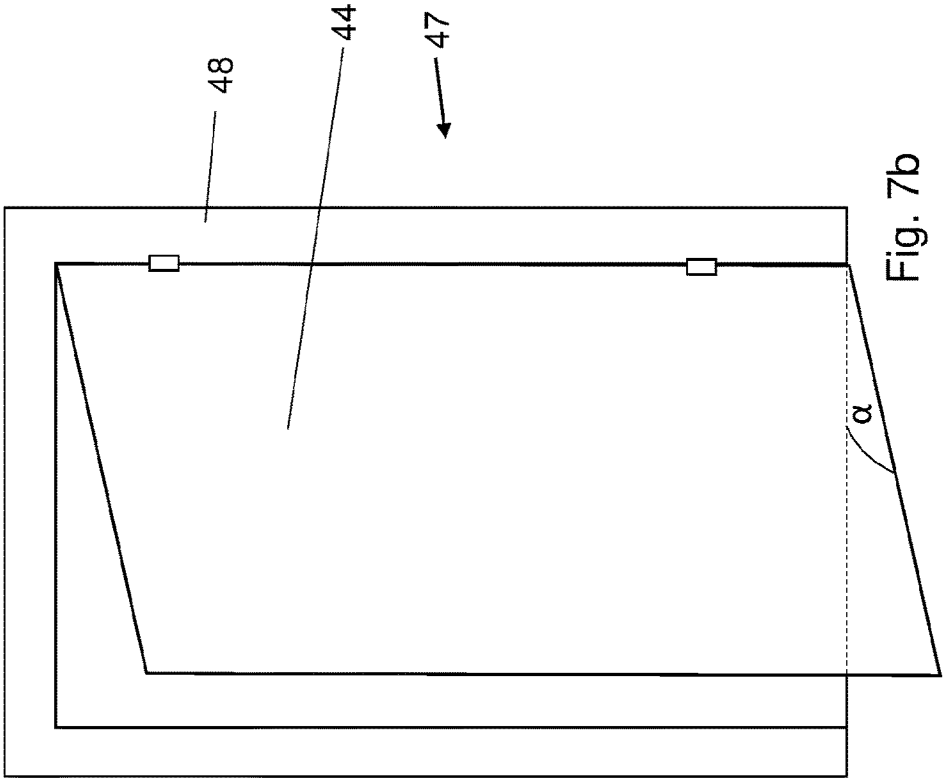
FIG. 7*b* the leaf from FIG. 7*a* in an open position.
Figure 7A:
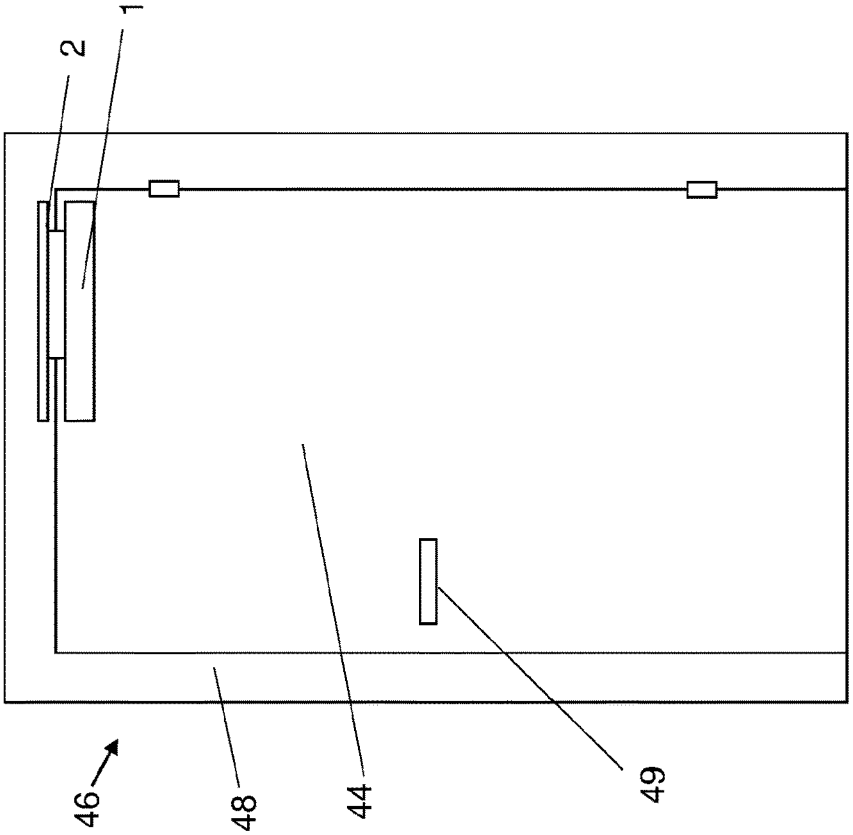
FIG. 7*a* a leaf in a closed position.

The closed position 46 of the leaf 44 can be seen in FIG. 7*a*. The open position 47 and an exemplary opening angle α of the leaf 44 can be seen in FIG. 7*b*. It can also be seen in FIG. 7*a* that the drive device 1 is mounted with its running rail 2 on a frame 48. A door handle 49 on the leaf 44 is also indicated in FIG. 7*a*.

Figure 8:
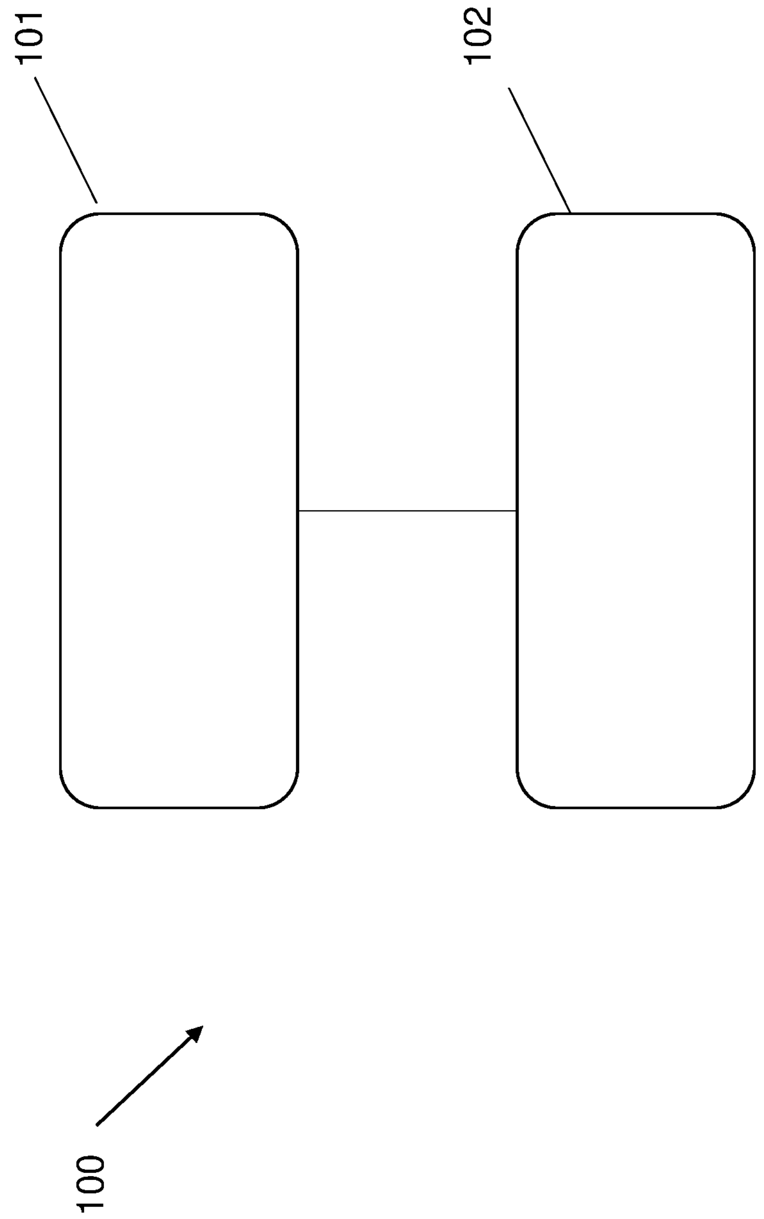
FIG. 8 a flow chart of an exemplary embodiment of a method for closing a leaf.

A flow chart of the method 100 is shown in FIG. 8.

During a closing movement of the leaf 44 from the open position 47 to the closed position 46, the electric machine 6 generates a first braking torque in a first method step 101. The first braking torque opposes the closer torque of the closer module 11, such that the closing movement of the leaf 44 is slowed down and/or stopped.

In a second method step 102 following the first method step 101, the electric machine 6 generates an additional closing torque, which adds up to the closer torque of the closer module 11, such that the closing movement of the leaf takes place with an increased drive torque. The electric machine 6 preferably generates the additional closing torque when the leaf 44 has fallen below a first predetermined opening angle α.

During the second method step 102, the controller device of the controller module 26 controls the additional closing torque of the electric machine 6 depending on the opening angle α of the leaf 44.

If a person's intention to open is detected, an additional opening torque is generated by means of the electric machine 6, wherein the intention to open is detected by at least one sensor. The sensor is formed as an acoustic sensor, wherein the additional opening torque is already generated in the closed position 46 of the leaf 44.

The invention claimed is:

1. A method for pivoting a leaf from a closed position at an opening angle of 0° to an open position at an opening angle of greater than 0° and/or from the open position at the opening angle (α) of greater than 0° to the closed position at the opening angle of 0° by a leaf torque, wherein the leaf torque comprises a manual torque generated by a person, and a drive torque, wherein the drive torque is generated by a drive device with a drive module, a closer module and a controller module, wherein the drive module has an electric machine comprising a stator and a rotor, wherein the closer module has an energy storage, wherein the controller module has a controller device, wherein the drive torque comprises a machine torque generated directly or indirectly by the electric machine and a closer torque generated by the closer module, wherein at at least one opening angle of greater than 0°, the machine torque is greater than 0 Nm, wherein if an intention to open is detected, an opening torque is generated by the electric machine, wherein the intention to open is detected by at least one intention-to-open sensor, wherein the at least one intention-to-open sensor is formed as an acoustic sensor for detecting structure-borne noise and/or airborne noise, wherein the opening torque is already generated in the closed position of the leaf.

2. The method according to claim 1, wherein during a closing movement of the leaf from the open position to the closed position in a first method step, the electric machine generates a first braking torque, wherein the first braking torque is the closer torque of the closer module in the opposite direction, such that the closing movement of the leaf is slowed down and/or stopped.

3. The method according to claim 2, wherein in a second method step following the first method step, the electric machine generates an additional closing torque, added to the closer torque of the closer module, such that the closing movement of the leaf takes place with increased drive torque, such that the electric machine generates the additional closing torque when the leaf has fallen below a first specified opening angle, such that the first specified opening angle is in a range from 0.5 degrees to 7 degrees.

4. The method according to claim 3, wherein during the second method step, the controller device controls the additional closing torque of the electric machine depending on the opening angle of the leaf.

5. The method according to claim 3, wherein the controller device monitors the opening angle in the second method step, wherein the drive device increases the additional closing torque when the leaf is in the open position, for longer than a first predetermined period of time, during the second method step, in that during the second method step, the additional closing torque is increased continuously or step-wise until the leaf is in the closed position or until the maximum machine torque of the electric machine is reached.

6. The method according to claim 3, wherein during the second method step, the drive device emits an error message when the maximum machine torque of the electric machine has been reached and the leaf is in the open position, and/or when the leaf is in the open position for longer than a second predetermined period of time.

7. The method according to claim 2, wherein during a closing movement of the leaf from the open position to the closed position, the electric machine generates a second braking torque, over a certain period of time, wherein the second braking torque opposes a closer torque of the closer module and compensates the closer torque of the closer module, such that the closing movement of the leaf is stopped if the closing movement of the leaf is stopped by the manual torque for at least a third predetermined period of time.

8. The method according to claim 7, wherein the second braking torque is generated until a closing signal to the drive device is sent and/or until the leaf resumes the closing movement due to the manual torque.

9. The method according to claim 1, wherein the opening angle is determined by an angle measuring device of the drive device, wherein the angle measuring device comprises at least one angle measuring sensor, wherein the at least one angle measuring sensor comprises at least one Hall sensor and/or as at least one inertial sensor.

10. The method according to claim 9, wherein the at least one angle measuring sensor is formed as part of the drive device, in that the at least one angle measuring sensor is arranged at least partially within a housing of the drive device, or in that the at least one angle measuring sensor is arranged on the leaf.

11. The method according to claim 1, wherein a further sensor of the at least one intention-to-open sensor is formed as an inertial sensor or as a Hall sensor or a combination thereof.

12. A drive device configured for pivoting a leaf from a closed position at an opening angle of 0° to an open position at an opening angle of greater than 0° and/or from the open position at the opening angle of greater than 0° to the closed position at the opening angle of 0° by a leaf torque, wherein the leaf toque comprises a manual torque, generated by a person, and a drive torque, wherein the drive torque is generated by the drive device with a drive module, a closer module and a controller module, wherein the drive module has an electric machine comprising a stator and a rotor, wherein the closer module has an energy storage, wherein the controller module has a controller device and wherein the drive torque comprises a machine torque generated directly or indirectly by the electric machine and a closer torque generated by the closer module, wherein at at least one opening angle of greater than 0°, the machine torque is greater than 0 Nm, wherein the drive device comprises at least one intention-to-open sensor detecting an intention to open, wherein the at least one intention-to-open sensor is formed as an acoustic sensor for detecting structure-borne noise and/or airborne noise, wherein if the intention to open is detected an opening torque opposing the closer torque is already generated in the closed position of the leaf.

13. The drive device according to claim 12, whereby a transmission coupled with the electric machine and an output shaft rotatable about an output axis for, non-rotatable, connection to a lever, in that the transmission has a transmission ratio defined as a quotient of the rotational speed of the rotor as a dividend and the rotational speed of the output shaft, wherein the transmission ratio is less than 125.

14. The drive device according to claim 12, wherein the electric machine is formed as an axial flux machine, in that the stator has one or more coils and the rotor has one or more permanent magnets.

* * * * *